United States Patent [19]

Dust et al.

[11] Patent Number: 5,746,253
[45] Date of Patent: May 5, 1998

[54] CRUSHABLE CORE AND COVER ASSEMBLY HAVING AN EXPANDED TUBING AND A CRUSHABLE CORE

[75] Inventors: Herbert Dust, Buchholz; Gerhard Lohmeier, Hamburg; Manfred G. Viebranz, Appel, all of Germany

[73] Assignee: Minnesota Mining and Manufacturing Company, St. Paul, Minn.

[21] Appl. No.: 652,876

[22] Filed: May 23, 1996

[30] Foreign Application Priority Data

Jun. 21, 1995 [EP] European Pat. Off. ............... 95201679

[51] Int. Cl.$^6$ ........................................ F16L 7/00
[52] U.S. Cl. ................ 138/178; 138/140; 138/137
[58] Field of Search .......................... 138/177, 178, 138/137, 140; 428/36

[56] References Cited

U.S. PATENT DOCUMENTS

| | | | |
|---|---|---|---|
| 3,189,328 | 6/1965 | Hotchkiss et al. | 261/28 |
| 3,515,798 | 6/1970 | Sievert | 174/135 |
| 4,206,786 | 6/1980 | Wetmore | 138/178 |
| 4,287,012 | 9/1981 | Midgley et al. | 156/86 |
| 4,338,970 | 7/1982 | Krackeler et al. | 138/141 |
| 4,410,009 | 10/1983 | Blum | 138/109 |
| 4,457,962 | 7/1984 | Jaffe et al. | 428/36 |

FOREIGN PATENT DOCUMENTS

| | | | |
|---|---|---|---|
| 0 245 837 | 11/1987 | European Pat. Off. | A61M 25/00 |
| 0 530 952 A1 | 10/1993 | European Pat. Off. | B29C 61/06 |
| 2 315 158 | 6/1976 | France | H01B 17/58 |
| WO 83/01225 | 4/1983 | WIPO | B29F 1/00 |
| WO 91/16564 | 10/1991 | WIPO | F16L 11/00 |

*Primary Examiner*—Patrick F. Brinson
*Attorney, Agent, or Firm*—Gerald F. Chernivec; John C. McFarren

[57] ABSTRACT

A cover assembly including a crushable support (100) for supporting an elastomeric tube is described, the elastomeric tube being recoverable to at least a part of its original size and shape after collapse of said support, comprising: a plurality of substantially longitudinally extending portions (12); a plurality of connection portions (14), each longitudinally extending portion (12) being connected to, and spaced apart from neighboring longitudinally extending portions (12) by at least one of said connection portions (14) to form a rigid structure; and said at least one of said connection portions (14) including at least one frangible zone (16).

14 Claims, 11 Drawing Sheets

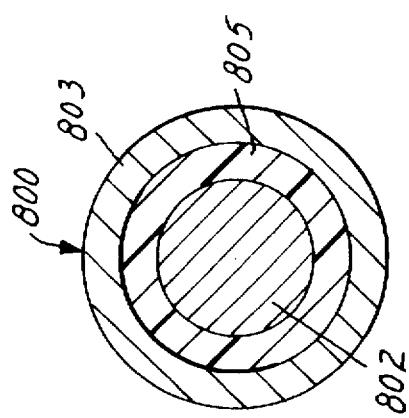
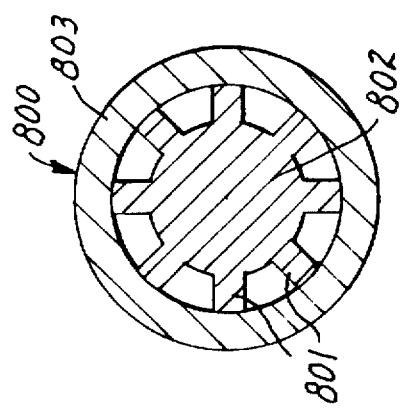
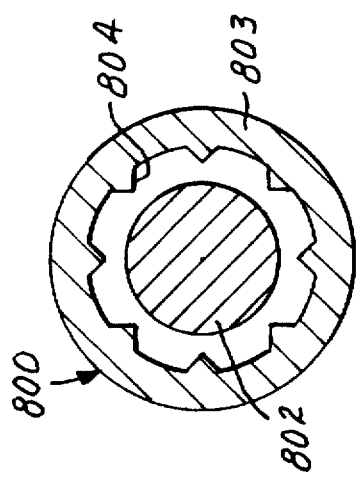
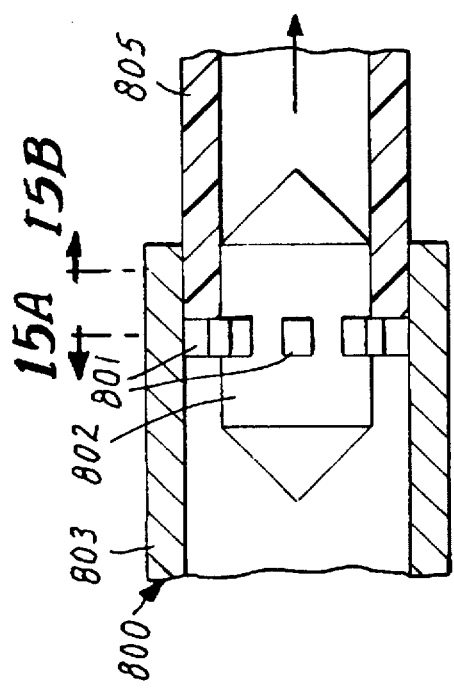

CRUSHABLE CORE AND COVER ASSEMBLY HAVING AN EXPANDED TUBING AND A CRUSHABLE CORE

TECHNICAL FIELD

The invention relates to a crushable structure for use with an expanded elastomeric tubing, an assembly of the crushable structure and an expanded elastomeric tubing and a method of manufacturing the crushable structure.

BACKGROUND ART

U.S. Pat. No. 3,318,9328 describes an elastic cap for wooden poles which is held in an expanded state by a sleeve which can be made from a material which is frangible, or a material 15 which eventually evaporates or melts, or can be cracked with a sharp blow after installation.

EPA 0 530 952 describes various cover assemblies with frangible cores, each assembly including an expanded elastomeric tube supported in the expanded state by an internal frangible support core. One type of support core is tubular and includes threads. With this design there is little control of core fragment size when the core is crushed. Another type is manufactured from filaments in a woven or overlay structure. This type has been observed to collapse by folding and breaking at points of weakness rather than fiber fracture. Failure can occur at multiple undefined sites.

U.S. Pat. No. 4 338 970 describes a recoverable sleeve comprising an elastomeric sleeve held in an expanded state and an outer restraint bonded to the elastomeric sleeve whereby the restraint is capable of being segmented and peeled from the elastomeric sleeve. The restraint can be a brittle material which is simply shattered with a hammer or can be a malleable material such as metal which can be segmented by tearing along weakened lines.

U.S. Pat. No. 4 410 009 describes a recoverable sleeve assembly having a radially expanded inner elastomeric tube and an outer rigid tube surrounding and secured to the inner tube. The outer sleeve can be fractured by impact of force, e.g. from a boot, and the fragments of the outer tube can be peeled from the inner tube.

U.S. Pat. No. 3 515 798 describes a cover assembly including a radially stretched elastomeric outer tube and a supporting inner hollow core member. The core member has a deep helical groove so that the core can be segmented and removed from the assembly.

U.S. Pat. No. 4 287 012 describes a flexible hollow article having an expanded elastomeric inner member and an outer restraining means. The restraining means is made of a notch sensitive material so that when score lines are made in the restraining means, they can be propagated through the material by distorting the article. The outer restraining means has an extension to break of at least 25%.

SUMMARY OF THE INVENTION

In accordance with a first aspect of the present invention, a hollow crushable support is provided for supporting an elastomeric tube, the elastomeric tube being recoverable to at least a part of its original size and shape after collapse of said support, comprising:

a plurality of substantially longitudinally extending portions being formed of a first material;

a plurality of neighboring substantially longitudinally extending frangible zones, each said longitudinally extending portion being connected to each neighboring longitudinally extending portion by one of said longitudinally extending frangible zones to form a rigid structure; and said longitudinally extending frangible zones being formed from a second material having an elongation at break value substantially lower than first material said longitudinally extending portions.

According to the second aspect of the invention, a hollow crushable support for supporting an elastomeric tube is provided, the elastomeric tube being recoverable to at least a part of its original size and shape after collapse of said support, comprising:

a plurality of substantially longitudinally extending portions formed from a first material;

a plurality of neighboring connection portions, each longitudinally extending portion being connected to, and spaced apart from neighboring longitudinally extending portions by at least one of said connection portions to form a rigid structure; and said at least one of said connection portions including at least one frangible zone, wherein said frangible zone is formed a second material having a substantially lower elongation at break than elongation at break than said first material.

A hollow crushable supports of the invention can be formed from insulating materials, preferably from one or more polymeric compounds, or mixture of at least one polymer and an additional material immiscible therewith. The immiscible material is preferably PMMA, polystyrene or another long chain polymer.

The composition can includes a variety of fillers, such as microbeads or microbubbles. Preferred microbeads have a diameter in the range of from about 20 to about 100 micrometers, most preferably about 50 to 60 micrometers. When used, said microbeads and the remaining material of said crushable support are in a volume ratio of between about 1:2 and 2:1 microbeads to remaining material, preferably about 1:1.

The longitudinal and said connecting portions of crushable supports of the invention can be formed from monofilaments, more preferably multifilaments, i.e., nonwoven webs.

The support can include voids and be thus discontinuous. The voids can be holes formed in said support by any conventional means, or where the nonwoven webs are used, the voids can be simply spaces between the fibers.

The frangible zone of the crushable support means can be provided in a variety of aspects, i.e., the zone can be a weld line of the polymer, it can also be perforation(s) or grooves in the support.

Each variation of support is useful for supporting a radially stretched elastomeric tube, which can be of varying size, i.e., the tube can be longer than said crushable support and, in one embodiment, at least one end of the tube is folded back over the remaining portion.

Cover assemblies formed with these elastomeric tubes can comprises only those layers discussed above, or can also include at least one additional layer within the support, e.g., a layer of a viscous, sealant material such as a conductive or semiconductive mastic.

The crushable support of the invention is produced by methods such as injection molding wherein the molten polymer flows from one end of said crushable along the longitudinally extending portions, entering the connecting portions from the longitudinally extending portions, and producing the frangible zone in the connecting portion at a weld line of said molten polymer. Where mixtures of polymer are used, molten polymers can be segregated and then coalesced to form a plurality of longitudinal weld lines.

Some aspects of the invention provide a crushable support structure which collapses in a defined way and produces fragments which have a defined shape and size.

The invention provides a crushable support structure which is thin, strong and light weight, and which can support an expanded elastomeric tube at temperatures in excess of 40° C., or even 60° C.

As used herein, there terms have the following meanings.

1. The term "partially sintered" means that the ceramic is not at full density, but rather, processing is carried out so that the ceramic body remains porous.

2. The invention and its embodiments, advantages and modifications will be described with respect to the following drawings.

BRIEF DESCRIPTION OF THE DRAWINGS

FIGS. 15 and 16 show extrusion die details for making support structures in accordance with the fourth embodiment of the present invention;

DESCRIPTION OF THE PREFERRED EMBODIMENTS OF THE INVENTION

Figure 1:
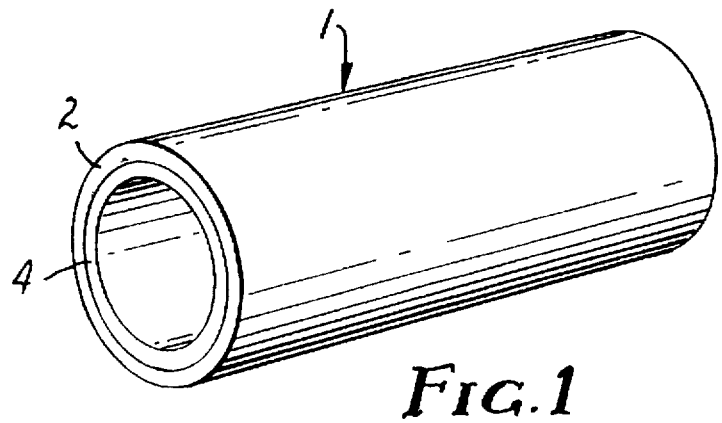
FIG. 1 shows a schematic drawing of a cover assembly in accordance with a first embodiment of the present invention.

FIG. 1 illustrates a cover assembly, generally indicated as 1, which includes an outer tube 2 and a frangible inner support core structure 4. In accordance with the invention, the tube 2 can be made of a flexible material which can be stretched radially to several times its original dimensions and is recoverable to substantially its original size and shape. Tube 2 can be expanded to a large diameter and shrink back to substantially its original dimensions by the application of heat by means of heat shrink or cold shrink methods. An inner frangible core 4 and an outer stretched elastic tube 2, will be thenceforth described; the present invention is not, however, limited to this assembly. The order of the components can be reversed so that the outer cylinder shown as 2 in FIG. 1 can be the frangible support structure and the inner cylinder shown as 4 can be a flexible tube of elastic material which has been radially stretched and attached to the inner surface of the outer frangible tube 2., e.g., by means of adhesive or the two can be adhered by means of heat and pressure.

Some suitable materials for the flexible elastic tube 2 as used with any of the embodiments of the present invention are described in U.S. Pat. No. 3,515,798, which is incorporated herein by reference. No restriction is anticipated on the chemical nature of the tube 2 material except that it must possess elasticity which allows it to be stretched and then shrink to substantially its original dimensions.

Examples include rubbery elastomers such as natural rubber, natural and synthetic polyisoprenes, cis-polybutadiene and styrene butadiene rubber, butadiene-acrylonitrile rubber, polychloroprene (neoprene), butyl rubber, polysulfide rubber, silicone rubber, urethane rubber, polyacrylate rubber, epichlorhydrin homopolymer and copolymer rubbers, propylene oxide rubber, fluorosilicone rubber, fluorocarbon rubber, chlorosulfonated polyethylene rubber, chlorinated polyethylene rubber, ethylene-propylene rubber, ethylene-propylene monomer terpolymer rubber (EPDM), nitroso rubber, or phosphonitrilic rubber can be suitable. Preferred materials are ethylene-propylenediene monomer terpolymers (EPDM). The rubbery material selected preferably has a permanent set of less than about 30%.

Compositions may be formulated including a variety of adjuvants such as flame retardants, conductive materials, materials to improve weathering properties, materials to produce stress grading properties, and the like.

A distinguishing feature of support structure 4 in accordance with any of the embodiments of the present invention is its ability to collapse on demand by breaking. In accordance with the present invention crushable can refer to the property of the frangible support structure or of the assembly of the support structure and an elastomeric tube. The support structure can be crushed or made to collapse by use of the hand or by tools, provided the elastomeric tube is not damaged thereby.

The frangible core is provided with frangible weak zones such that core 4 collapses in a defined way producing fragments of a specified size. The frangible weak zones are made of a brittle material, preferably a material which has an elongation to break of less than about 10% and preferably less than about 5% and most preferably less than about 3%. It is preferred if the crushable support structure 4 is made from such a material as a whole. Preferably, most of the fragments of the support structure remain substantially within the tube 2 after the support structure has collapsed.

Materials useful for core 4 are preferably insulating materials, which have a room temperature elastic modulus greater than about 2,500 N/mm2 (ASTM D638), and preferably greater than about 5,000 N/mm2. The range of elastic modulus of from about 10,000 to about 40,000 N/mm2 is particularly preferred. Suitable materials for support core 4 are brittle resins or elastomers selected from the general classes of, polystyrenes including styrene acrylic nitrites and blends of polystyrene and polyphenylether, polyphenylene sulfides, polyesters, polyacrylates including polymethylmethacrylate, liquid crystal polymers including those based on polyester and polyesteramines as well as mixtures and compounds of any of the above materials. Core 4 can also be made from brittle resin materials such as epoxy resins, amine cured, two part epoxy resins, transparent styrene polyester resins and solvent soluble acrylate resins.

Thermosetting resins such as phenolics are also suitable. The materials can be reinforced by fibers, flakes, microbeads or microbubbles such as glass fibers, mica flakes, glass microbeads and the like. Preferred microbeads or microspheres in the range of from about 50 to about 60 micrometers in diameter and a 1:1 ratio by volume of beads to resin. Ratios below approximately 1:2 can render the core too flexible and ratios above approximately 2:1 render the core 4 too brittle to support the tube 2.

Core 4 can also be made from partially sintered or porous ceramic materials, oxide and/or non-oxide composite materials or glasses, including materials comprising partially sintered alumina, spinels, zirconia, mullite, cordierite and other silicates. These porous materials can be further modified by impregnation with an organic resin or with a solution carrying an organic polymer or other organic species. The core 4 can also be prepared from ceramic beads by either partially sintering the beads into a composite material or by fixing the beads using an organic polymer or resin.

Useful ceramic materials for core 4 also include aluminous ceramics, silicates, zirconia and the like. Useful non-oxide materials include metal carbides, metal nitrites, metal borites and the material can also include a combination of oxide and non-oxide components.

The ability of core 4 to collapse on demand is not only dependent on the selection of the base material and filler components of the core 4 but also on the design of the structure of core 4, that is, on clearly defined frangible weak zones which allow core 4 to fracture in a predetermined way and thus to determine the size, shape and/or uniformity of the fragments produced on disintegration. The material making up the frangible weak zones preferably has a breaking strength substantially lower than the bulk material in the remaining parts of core 4.

Substantially all of the fragments of the core can be retained within the elastomeric tube 2 when it collapses down onto the substrate. Where the cover assembly 1 is to be used to insulate the junction between two cables, it is very desirable that the trapped fragments of the inner core 4 be insulating.

FIGS. 2 to 5 show a second embodiment of the crushable core 100 in accordance with the present invention. A crushable core 100 is constructed as a lattice structure having substantially longitudinally extending (12) and circumferentially or transversely extending members (14)

Figure 2:
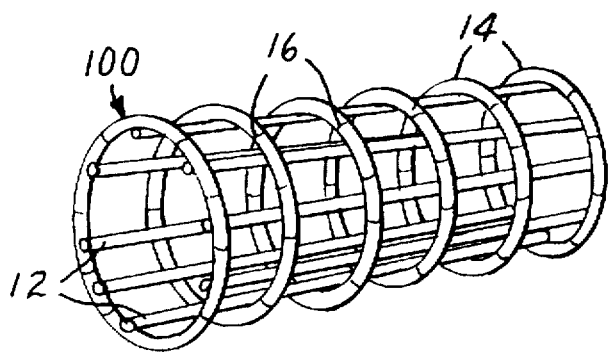
FIGS. 2 to 5 show support structures in accordance with a second embodiment of the present invention.
Figure 3:
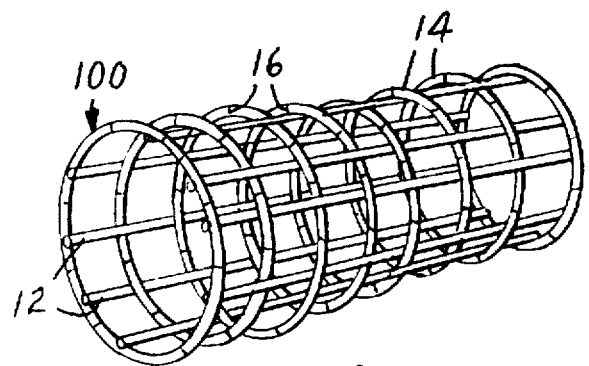

FIGS. 2 and 3 show crushable cores 100 which can be manufactured from mono or multifilament thread and can be woven (FIG. 3) or overlaid (FIG. 2) to produce a structure having longitudinal members 12 and circumferential connecting members 14 which join adjacent longitudinal members 12 and maintain these in a spaced-apart arrangement. Such structures are generally described in EPA 0530952 which is incorporated here by reference.

In addition, the crushable cores 100 have discrete frangible zones which are located in the connecting members 14 at positions which lie between the joining points of the connecting members 14 to the longitudinal members 12. These weaker, frangible zones can be introduced by a variety of methods, e.g., partially cutting or abrading through the mono or multi-filament fiber at the appropriate positions of the connecting members 14, or exposure of the multi-filament fiber to a locally high temperature from a high energy source such as a laser beam, to partially sinter it and thus create a discrete frangible zone 16. This structure is designed to collapse at these weak zones resulting in fragments of the crushable core 100 which include a longitudinal member 12 and parts of the connecting member 14 attached to it.

The production of fragments consisting mainly of one or at most a few of the longitudinal members 12 has the advantage that the fractured longitudinal members 12 protect the recovered tubing tube 2 when it conforms to sharp diameter steps in the underlying substrate. The weakened, frangible zones 16 can be placed mid-way between adjacent longitudinal members 12 and, as an alternative, more than one frangible zone 16 can be provided in the section of the connecting member 14 which lies between adjacent longitudinal members 12.

Figure 4:
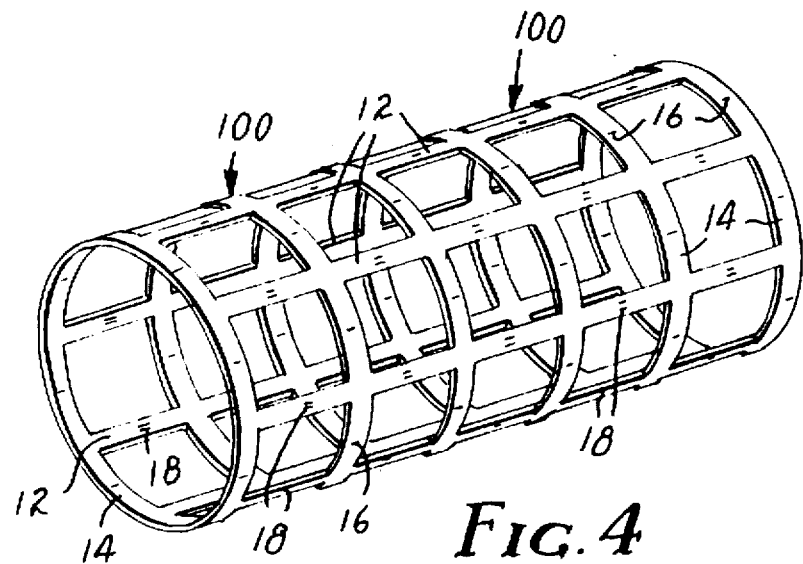

FIG. 4 shows a preferred embodiment of crushable core 100, which is a lattice or net structure with discrete zones 16 provided in the connecting members 14 which connect the longitudinal members 12 transversely. Such weakened frangible zones 16 can be provided by cutting or abrading through a part of the connecting members 14, or they can be made frangible and brittle by partially sintering discrete zones 16 located in the connecting member 14 between the longitudinal members 12, e.g. by exposure to a laser beam.

Figure 5:
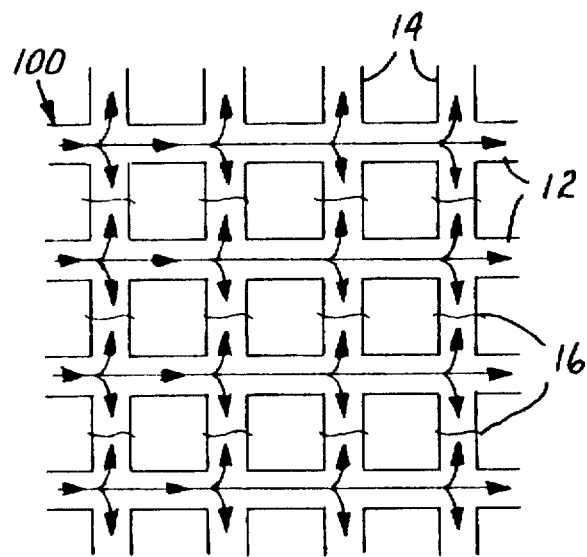

The preferred method of manufacturing the crushable core 100 shown in FIG. 4 will be described with respect to FIG. 5. The crushable core 100 can be made by injection molding. It is preferred if the injection of the plastic material into the injection mold is carried out from an annulus at one end of the crushable core 100 so that the material flows along the longitudinal members 12 and enters the connecting members 14 therefrom as shown schematically in FIG. 5. This method of injection molding creates "adjoin" or weld lines between two fronts of molten plastic material moving from adjacent longitudinal members 12 into a particular connecting member 14. The weld lines between the fronts of plastic materials can lie substantially in the middle of the connecting members 14. Additional frangible zones 18, can be introduced into the longitudinal members 12, between the junction points with connecting member 14, by mechanical abrasion, cutting or partial sintering.

It is particularly preferred if the materials used for injection molding have the property of producing a weak weld line for the frangible zones when separate fronts of molten plastic meet at the relevant parts of the injection mold. Suitable materials can be PMMA, available as Lucryl® from BASF, AG, e.g., Lucryl®G55; or polystyrene also available from BASF, AG, e.g., type 144C or mixtures of polystyrene and PMMA. A particularly preferred material for injection molding the crushable core 100 in accordance with the first embodiment of the present invention is a polymer of the general type called Liquid Crystal Polymers (LCP). LCP's are available as Vectra® from Hoechst AG, and in particular the type B130 is preferred. Whatever material is selected may utilize fillers etc as discussed, supra.

A crushable core 100 formed from BASF144C polystyrene having an internal diameter of approximately 33 mm and a uniform thickness of 0.6 mm, a spacing of adjacent longitudinal members 12 and connecting members 14 of approximately 3 mm was found to be suitable for supporting expanded silicone tubes during long term storage above 60° C.

A crushable core 100 with an internal diameter of approximately 33 mm, a thickness of 0.8 mm and a longitudinal member and connecting member spacing of approximately 3 mm was found to be suitable for supporting both silicone and EPDM stretched elastomeric tubing during long term storage at temperatures between 60° and 80° C. Both types of crushable core 100 collapsed by breaking mainly along the weak frangible zones in the connecting members 14 which lay roughly mid-way between adjacent longitudinal members 12. The fragments produced consisted mainly of one or two longitudinal members 12 with broken portions of connecting members 14 attached thereto. The recoverable sleeve 2 shrank down after collapse of the crushable core 100 to entrap the fragments of the crushable core 100.

Tests have been carried out to determine the strength of the crushable cores 100 manufactured in accordance with the above method. Crushable cores 100 made of polystyrene Lucryl® 144C polystyrene with an internal diameter of 33 mm, a longitudinal and connecting member spacing of approximately 3 mm and a thickness of 0.6 mm withstood a load applied across a diameter of 1.30 Newtons per cm of length. The same crushable core 100 formed with a thickness of 0.8 mm withstood a transverse load of 2.5 Newtons per cm of length. A similar crushable core 100 manufactured from the LCP Vectra® B130 and formed a thickness of 0.8 mm withstood a transverse load of 3.4 Newtons per cm of length. All cores 100 could be crushed easily by hand.

Tests on manufactured samples of satisfactory crushable cores indicate that weld lines produced with the above arrangements and dimensions of crushable core 100 from LCP types B130 and C130 of the general type Vectra® from the company Hoechst AG, Germany have a breaking strength between two and ten times lower than that of the same material in the longitudinal members 12. Measured values for the weld line frangible zones 16 lie typically between three and six times lower in breaking strength than the same material in the longitudinal members 12.

Figure 7:
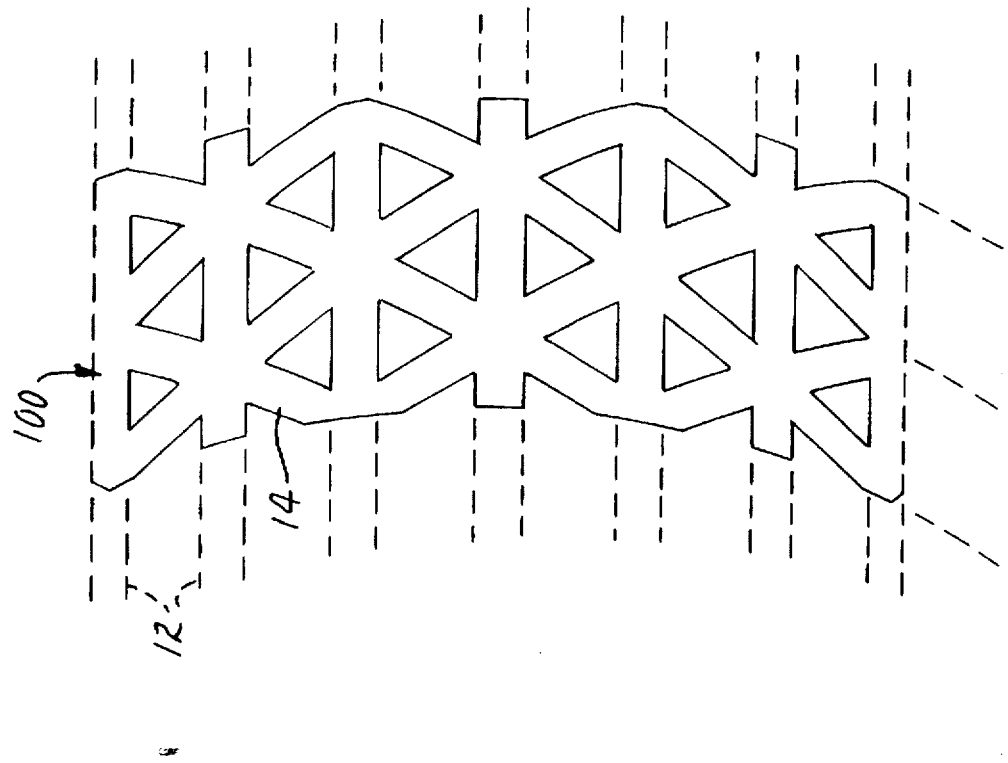
FIGS. 6 and 7 show modified support structures in accordance with the second embodiment of the present invention.
Figure 6:
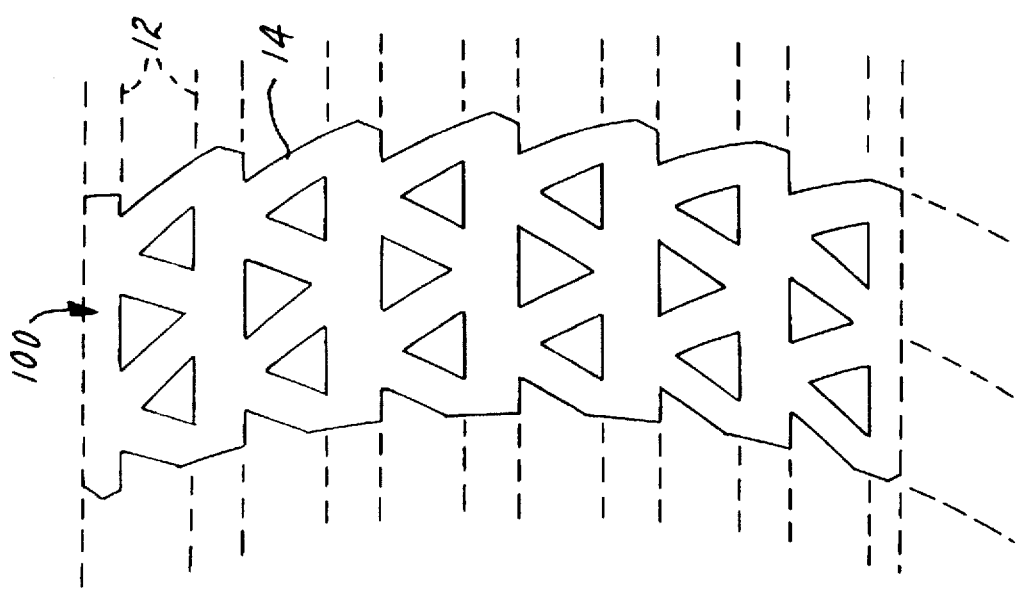

The lattice structure of crushable core 100 as shown in FIG. 4 has been described with respect to transverse connecting members 14 being substantially perpendicular to the longitudinal members 12 and is preferred. Further, as shown in FIG. 4 the transverse members 14 may form mechanically stable rings. As shown schematically in FIG. 6, transverse members 14 can be provided at an angle to the longitudinal members 12 such as to define triangular spaces in the lattice. Further, as shown in FIG. 7, the transverse members 14 can be arranged at an angle to the longitudinal members 12 so that back-to back triangular spaces are provided in the lattice. In both the structures shown in FIGS. 6 and 7, there is an increase of mechanical stress at the roots of the transverse members 14 when the structure is loaded with an expanded elastic tubing. This can reduce the pressure at which the support structure collapses compared with the rectangular space construction shown in FIG. 4. The cross-sections of the longitudinal members 12 and the connecting members 14 of the support structure 100 as shown in FIGS. 4 to 7 need not be circular. The members 12, 14 could have any suitable cross-section such as rectangular or diamond shaped.

Figure 8:
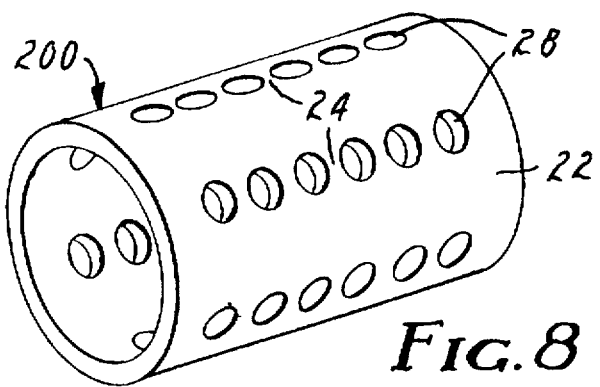
FIGS. 8 to 10 show support structures in accordance with a third embodiment of the present invention.
Figure 9:
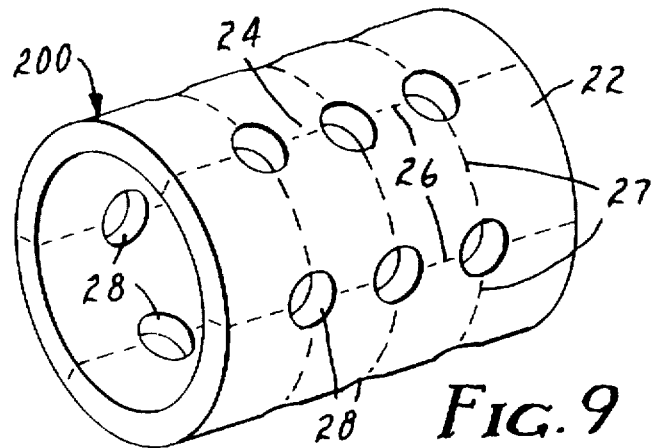
Figure 10:
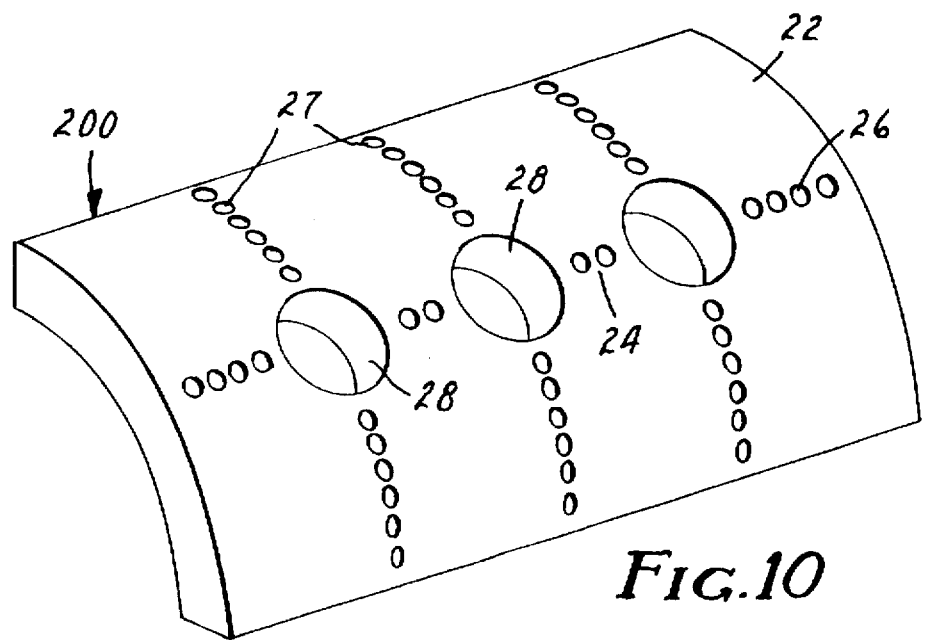

FIGS. 8 to 10 show crushable cores 200 in an embodiment which includes a substantially cylindrical core including spaces or holes 28 which segregate the core 200 into substantially longitudinal portions 22 and connection portions 24. It is not necessary for the invention that the core 200 be a circular cylinder; it can for example, be polygonal in cross-section and can taper towards one end. It is not necessary that the longitudinal portions 22 run exactly parallel to the axis of the core 200. The distribution of holes 28 can be such that the longitudinal portion 22 have a zigzag or wavy form. The holes 28 can be cut out from a tube of material or can be molded in place. The holes 28 can be cut by any means available, and need not be circular but can be square, polygonal or any suitable shape. Frangible zones 26 are provided in the connecting portions 24 as shown in FIG. 9. Optionally, further frangible zones 27 can be provided in the substantially longitudinally extending portions 22.

Further, as shown in FIG. 10, the frangible weak zones 26, 27 can be provided by perforating the material of longitudinal portions 22 and the connection portions 24 either by drilling or using a pulsed laser beam.

Figure 11:
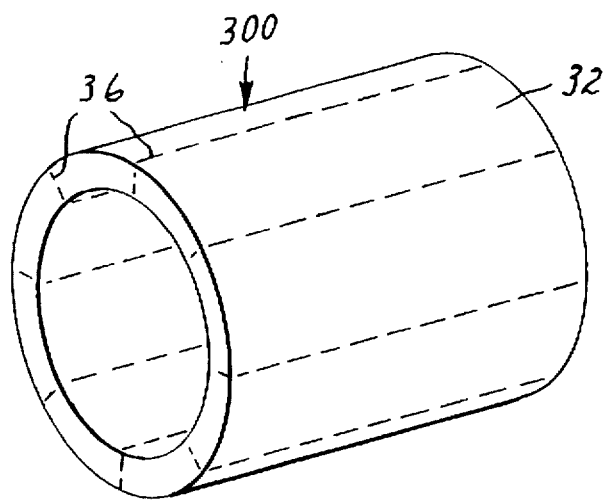
FIGS. 11 to 14 show support structures in accordance with a fourth embodiment of the present invention.
Figure 12:
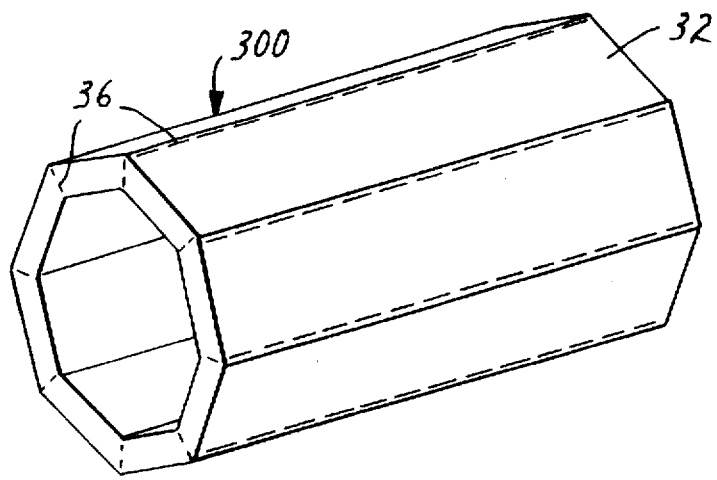
Figure 13:
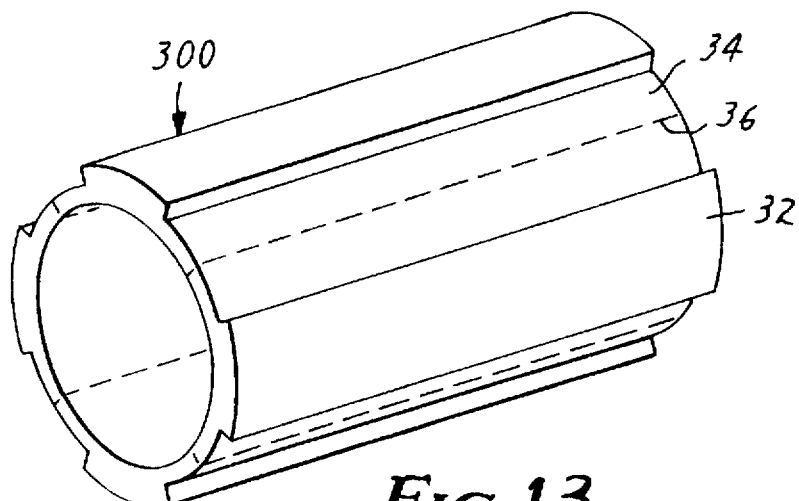

FIGS. 11 to 16 show a crushable core 300. The crushable core 300 as shown in FIG. 11 has a substantially cylindrical form and includes longitudinal portions 32 separated by frangible zones 36 which run substantially longitudinally. The cylindrical form of crushable core 300 need not be circular but can be polygonal as shown in FIG. 12. Further, as shown in FIG. 13, the thickness of the cylindrical form of the crushable core 300 need not be uniform but can include thicker longitudinal portions 32 than connection portions 34. The connection portion 34 can include one or more longitudinally extending frangible zones 36.

Figure 14:
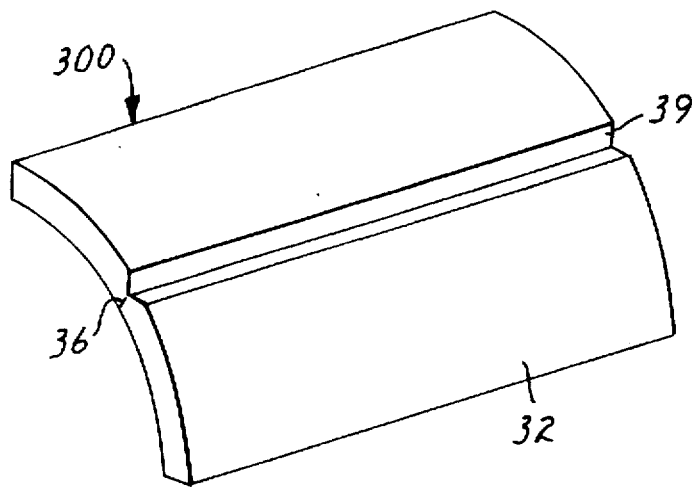

As shown in FIG. 14, the crushable core 300 can include a groove 39 which can be a V-shaped groove. The longitudinally extending frangible zone 36 can be provided in the material left between the bottom of the groove 39 and the inside surface of the crushable core 300.

The crushable core 300 in accordance with FIGS. 11 to 13 can be manufactured by extrusion. With reference to FIG. 15 the extrusion die 800 includes a cylinder 803 separated from a core 802 by die-bars 801. The molten plastic material is extruded in the direction shown to produce the extruded tube 805. It is necessary for the plastic material to separate around the die-bars 801 and to coalesce again to form a complete cylindrical body of the tube 805. The weld lines created by the separation of the molten plastic material at the die bars 801 and recombination to form the tube 805, provide the longitudinally extending frangible zones 36 of FIGS. 11 to 13. The end portion of die core 802 which is towards the extrudate tube 805, can be modified as shown in FIG. 16 so that its outer surface includes a plurality of grooves 804. Such a die construction is capable of producing a plurality of grooves 39 with longitudinally extending frangible zones 36 as shown schematically in FIG. 14.

Figure 17:
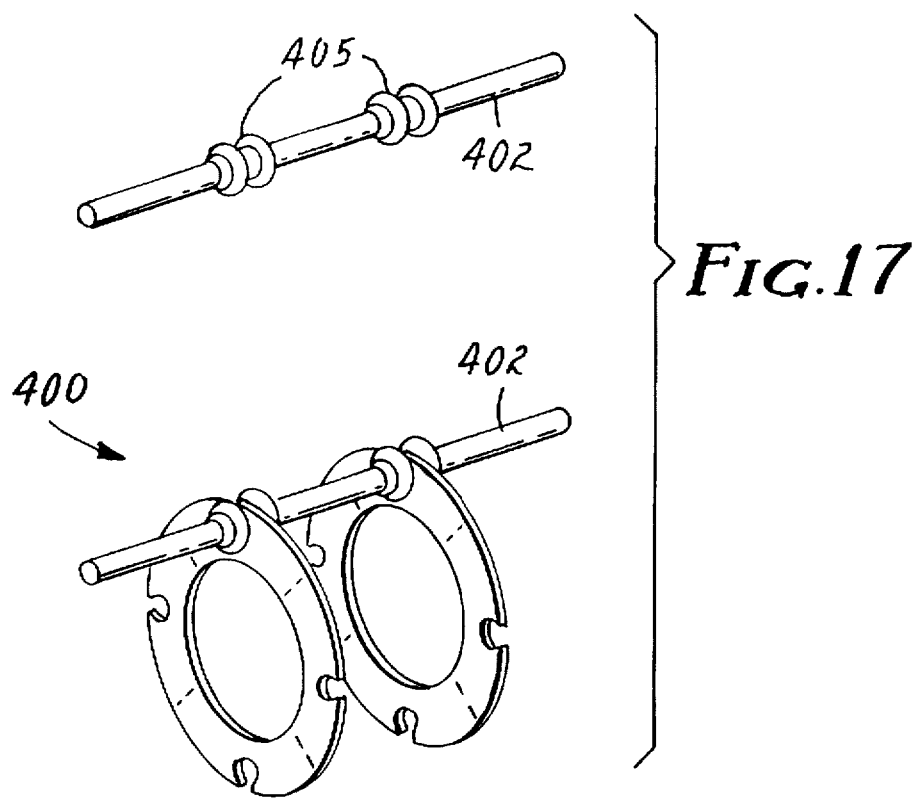
FIG. 17 shows a support structure in accordance with a fifth embodiment of the present invention.

FIG. 17 shows a crushable core 400 in accordance with the fifth embodiment of the present invention. Any of the materials described with respect to the first to fourth embodiment can be used with the fifth embodiment. The crushable core 400 includes a plurality of separate longitudinal members 402 which can be attached to separate connecting rings 414. Protrusions and/or notches 419 can be provided in the connecting rings 414 which cooperate with portions 405 of the longitudinal members 402 in order to locate and fix the longitudinal members 402. The connecting rings 414 include weak zones 406 which can be provided at the notches 419 or between the notches 419. In FIG. 17 only one longitudinal member 402 is shown and the connecting rings 414 are shown with four notches 419 for receiving longitudinal members 402. The invention is not limited thereto but can include connecting rings 414 including a plurality of notches 419 into which an equivalent number of longitudinal members 402 are fixed.

It has been found that frangible zones created by weld lines produced in the injection molding or extrusion process can have a high uniformity of breaking strength. Weak frangible zones produced by mechanical abrasion on the other hand are variable as the mechanical abrasion process can seriously weaken thin brittle structures due, for instance, to vibration or jitters of the cutting tool. Further, the control of routine process variables such as temperature, pressure, injection rate, amount and type of filler, choice of polymer and viscosity of polymer, can provide fine adjustment of the strength of the frangible zones to match specific applications. The reproducibility of satisfactory product is also higher resulting in a lower scrap rate.

Figure 18:
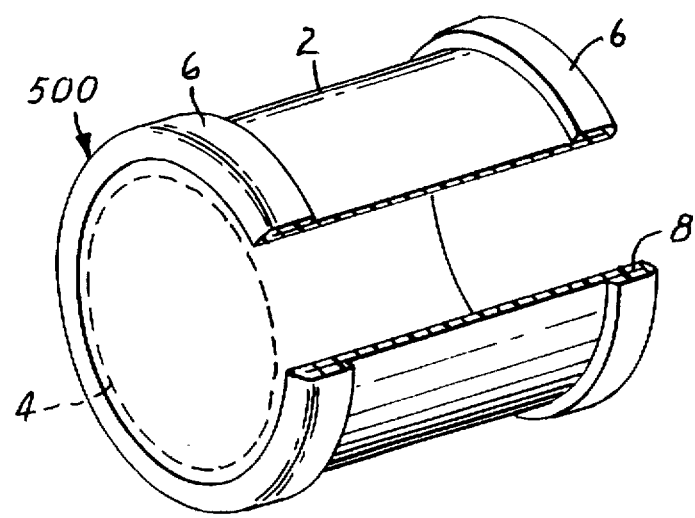
FIG. 18 shows a cover assembly in accordance with a sixth embodiment of the present invention.

In the embodiment of FIG. 1 the radially stretched, recoverable tubing 2 abuts the end of the crushable core 4. As shown in FIG. 18, the recoverable elastomeric tubing 2 can be longer than the crushable core 4 and the ends 6 of tube 2 which would extend beyond the ends of crushable core 4 are rolled back onto the outer surface of the tubing 2. The interface 8 between the inside surface of the rolled-back tubing 6 and the outside surface of the tubing 2 can be prepared with a lubricating agent such as graphite or silicone grease. The assembly 500 as shown in FIG. 18 is installed around the substrate by crushing core 4 allowing the recovery of elastomeric tube 2 onto the substrate. Subsequently ends 6 of the tubing 2 are rolled forwards over the ends of the crushable core 4 down onto the substrate. The advantage of assembly 500 is that the ends 6 of tubing 2 are rolled onto the substrate after the diameter of tubing 2 has already been reduced to that of the substrate. This eases rolling back of the end portion 6 as the tension in the interface 8 is reduced.

The assembly 500 as shown in FIG. 18 can be applied to any of the crushable cores described herein. The assembly 500 is particularly preferred for the crushable cores 300 in FIGS. 11–14.

Figure 19:
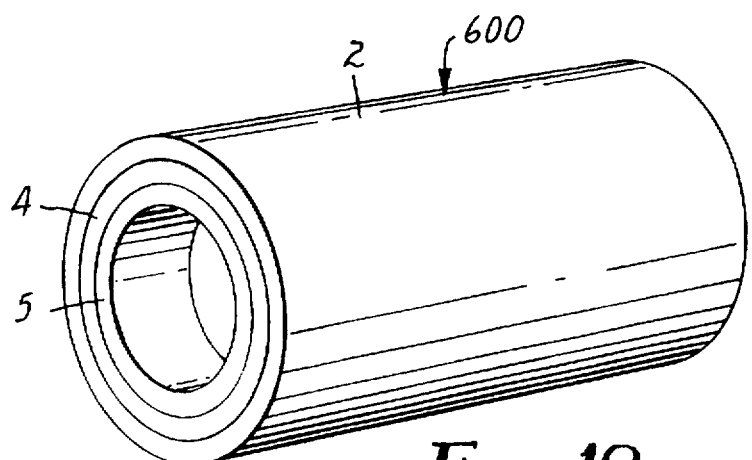
FIG. 19 shows a cover assembly in accordance with a seventh embodiment of the present invention.

FIG. 19 shows an assembly 600. As has been described with reference to FIG. 1, the assembly 600 also includes a recoverable tubing 2 and a crushable core 4. The crushable core 4 can be any of the crushable cores in accordance of the embodiments of the present invention. The recoverable tubing can be an elastic tubing as previously described or can be a dual-wall tubing. Further, within the crushable core 4 either along its whole length or for a portion or portions of its length, a conformable material 5 is applied. In case of lattice or net-like crushable cores 100, 200, the conformable material 5 can penetrate into the spaces of the lattice or net structure. The conformable material 5 can be a sealant. Sealant 5 can seal tubing 2 to a substrate when crushable core 4 is crushed and tubing 2 recovers onto the substrate. Sealant 5 is preferably a mastic or other suitable viscous material. This multilayer tubular structure 600 can be positioned, e.g., over an electrical wire connection and pressure applied, causing the core 4 to collapse. As the elastic tube 2 recovers, it exerts pressure on the sealant 5. This sealant 5 in turn engulfs the wire connection preventing ingress of unwanted contaminants. Simultaneously the sealant 5 flows around the fragments generated by the collapsing core 4. The sealant 5 then serves to fill the void space which exists around the wire connection and confine the core 4 fragments, seating them against the inner surface of the elastic tube 2. Ultimately the wire connection is insulated and effectively sealed off from any environmental contamination. Some suitable mastic include the components given in Table I

TABLE I

| alumina trihydrate | 30–40% | antimony pentoxide | 1–10% |
| hydrocarbon resin | 10–20% | asphalt | 1–10% |
| Polybutylene | 5–15% | ethylene propylene terpolymer | 1–10% |
| magnesium carbonate | 1–10% | isobutylene-isoprene polymer | 1–10% |
| polyisobutylene | 1–10% | carbon black | 1–10% |

Sealant mastics 5 useful in the present invention is not limited to the above exemplary formulation. The properties of the sealant layer 5 can be modified by incorporation of functional materials, i.e., careful selection of the concentration of a conductive or semi-conductive particulate provides sealant layers 5 which possess a variety of desirable attributes. Sealant layers useful for insulating, for controlling dielectric stress and for shielding have been demonstrated. A number of layers 4 having different desirable properties can be incorporated within the core 4 in addition to the one layer shown in FIG. 19.

Figure 20A:
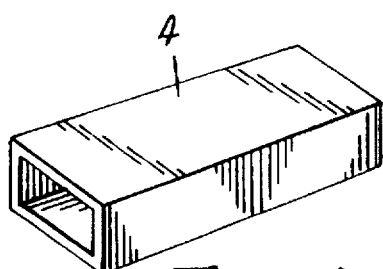
FIGS. 20 A to E show further constructions and forms of the support structure in accordance with the present invention.
Figure 20B:
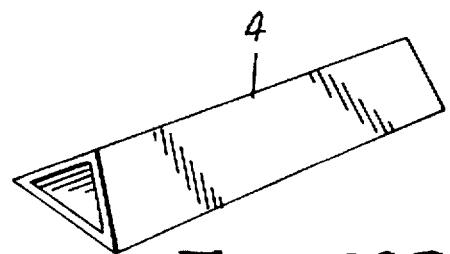
Figure 20C:
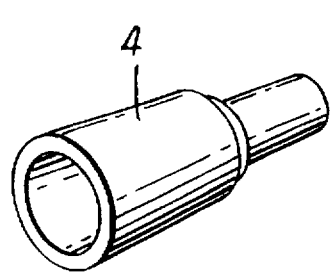
Figure 20D:
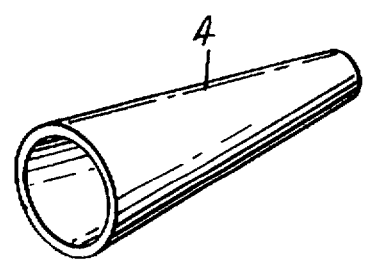
Figure 20E:
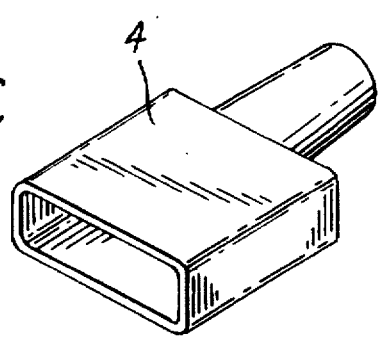

The crushable cores 4, 100, 200, 300 and 400 have been described with respect to cylindrical and in particular tubular structures, they can have any other suitable cross-section such as a rectangle as shown in FIG. 20A or a triangle as shown in FIG. 20B. Further, they need not have a uniform diameter along their length but can be stepped as shown in FIG. 20C and FIG. 20E or can be cone-shaped as shown in FIG. 20D. Changes of diameter as shown in FIGS. 20C and E can increase the loading on the crushable core 4 and also produce a non-uniform loading when a stretched elastic tubing is supported by the core. The thickness and/or width of the longitudinally extending and/or the connecting portions can be increased locally in order to provide greater stability in these regions.

A cover assembly 700 in accordance with an eighth embodiment of the present invention will be described with respect to FIG. 21. The eighth embodiment may provide the advantage of requiring less room for jointing. The cover assembly 700 is made up of two interlocking parts 40 and 42. These may include cylindrical cores 43, 46 made using the same materials as specified for the first to seventh embodiments, as well as radially expanded elastomeric sleeves 41, 44, respectively. The cylindrical core 46 is made up of a crushable section 49 and a solid tubular section 50 which may be made in a single injection molding step. The elastomeric sleeve 44 is held in a radially expanded state by means of the cylindrical core 46. The other cylindrical core 43 also includes a solid tubular portion 51 and a crushable portion (not shown). The elastomeric sleeve 41 is held in a radially expanded state by means of the cylindrical core 43. If necessary elastomeric sleeves 41 and 44 may be sealed to the solid tubular portions 51, 50, respectively, or parts 40, 42, by means of a suitable adhesive.

Core 46 may be mechanically interconnected with core 43 by means of a quick-fit connection. For example, the core 46 may be provided with a circumferential groove 48 which may have a semicircular cross-section or similar adjacent to the end of core 43 with the solid portion 50. The core 43 has a circumferential protuberance 45 in its solid section which has a cross-section designed to fit into the circumferential recess 48 of core 46. The diameters of cores 43 and 46 and the height of protuberance 45 and the depth of recess 48 are chosen so that core 43 slides within core 46 with sufficient interference between the outside diameter of the protuberance 45 and the inner diameter of the core 46 protuberance 45 locates in recess 48 in the final position.

The cover assembly 700 is installed in the following way. The separate cylindrical parts 43 and 46 are pushed over the left and right parts, respectively, of the cables to be jointed. After jointing the solid portions 51, 50 of cores 43, 46 are brought together and interconnected. Subsequently, crushable portions of cores 43 and 46 are collapsed thus installing elastomeric sleeves 41, 44 onto their respective parts of the cable.

A cover assembly 900 in accordance with a ninth embodiment of the present invention will be described with reference to FIG. 22. The cover assembly 900 includes two cylindrical parts 52, 54. Only the cylindrical part 54 will be described in detail. Cylindrical part 54 includes a first solid tubular portion 56 and second reduced diameter solid tubular portion 60. Cylindrical parts 52 and 54 may be made of any suitable material, in particular polypropylene, cross-linked polyethylene or similar. An elastomeric sleeve 64 is shrunk down onto the outside of solid tubular portion 60 of part 54. Sleeve 64 is generally held in the expanded state by a crushable core 62 in accordance with any of the first to seventh embodiments of the present invention. The sleeve 64 may be bonded and/or sealed to the solid tubular portion 60 by means of a suitable adhesive. Part 52 may be provided with a crushable end portion in the same way as described for part 54.

Parts 54 and 52 are provided with a recess 58 and a protuberance 55 as described for the eighth embodiment. The parts 52 and 54 are slipped over the respective cable ends as described with reference to the eighth embodiment and the crushable cores 62 of parts 52, 54 collapsed to install the respective elastomeric sleeves 64.

Figure 23A:
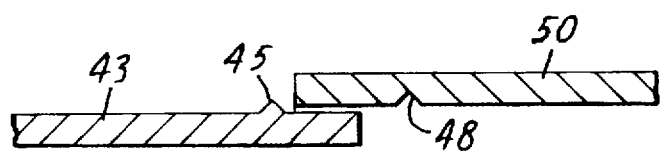
FIGS. 23A to C show detailed cross-sections of modifications of the snap connection of the eighth and ninth embodiments of the present invention.
Figure 23B:
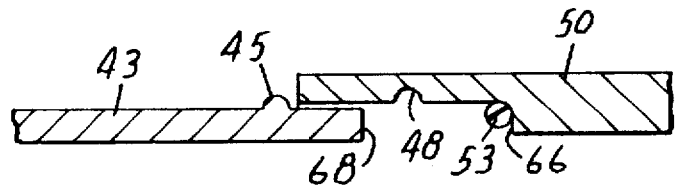

FIG. 23 shows various modifications of the quick-fit connection described with respect to the eighth and ninth embodiments. These will be described with reference to the eighth embodiment only. As shown in FIG. 23A, the circumferential protuberance 45 and the circumferential recess 48 may have a triangular cross-section. As shown in FIG. 23B, the end of solid tubular portion 50 of part 42 may be provided with a step 66 for location of an O-ring 53. The O-ring 53 may be any conventional O-ring. The distance between protuberance 45 of part 40 and the end surface 68 of solid tubular portion of part 40 is chosen so that when protuberance 45 is located in recess 48 of part 42, the O-ring 53 is compressed between step 66 of part 42 and end surface 68 of part 40. The O-ring 53 provides a water and moisture seal while protuberance 45 and recess 48 provide mechanical locking.

Figure 23C:
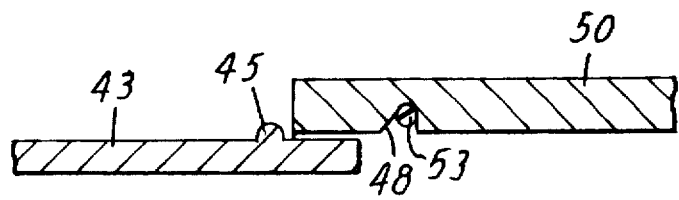

FIG. 23C shows a modification of the cover assembly shown in FIG. 23B. The O-ring 53 is located in the circumferential recess 48 of part 42. When protuberance 45 of part 40 locates in groove 48 of part 42, O-ring 53 is automatically placed under compression.

Figure 21:
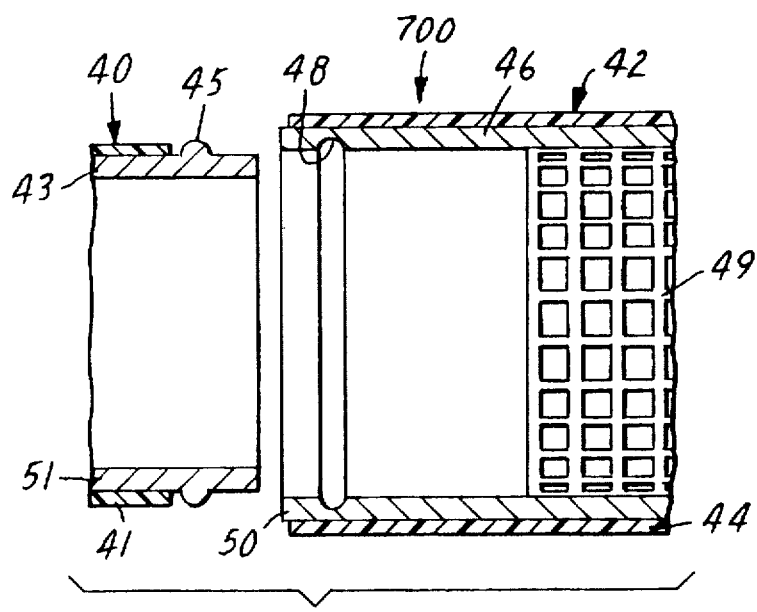
FIG. 21 shows a cover assembly in accordance with an eighth embodiment of the present invention.
Figure 22:
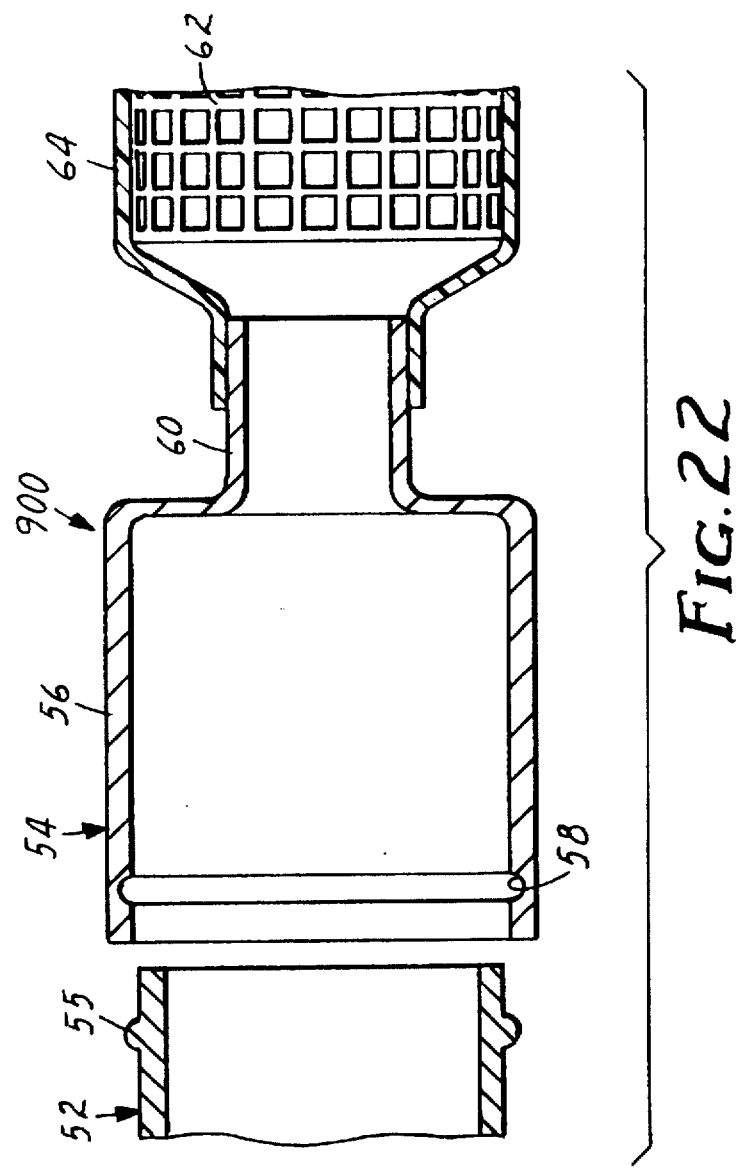
FIG. 22 shows a cover assembly in accordance with a ninth embodiment of the present invention.

The arrangements in FIGS. 21 to 23 are only schematic representations of cover assemblies 700 and 900 in accordance with the present invention and modifications. The skilled person would appreciate that the described arrangements may be adapted in a variety of way while staying within the scope of the present invention. In particular, the protuberance or ridge 45,55 may be placed on the inside of the solid portion 50,56 or parts 46,54 respectively and the groove or recess 48,58 may be placed on the outer surface of solid portion 51,57 of parts 40,52, respectively.

The crushable cores 4, 100, 200, 300, 400, 700 and 900 have been described with respect to cylindrical and in particular tubular structures. The invention is not limited thereto. The crushable core 4, 100, 200, 300, 400, 700 and 900 need not have a uniform diameter along its length but may be stepped as shown in FIG. 20C and FIG. 20E or may be cone-shaped as shown in FIG. 20D. Changes of diameter as shown in FIGS. 20C and 20E may increase the loading on the crushable core 4 and also produce a non-uniform loading when a stretched elastic tubing is supported by the core. In accordance with the invention the thickness and/or width of the longitudinally extending and/or the connecting portion may be increased locally in order to provide greater stability in these regions. Accordingly, the invention is not limited to support structures of either uniform thickness or uniform diameter.

We claim:

1. A hollow crushable support for supporting an elastomeric tube, the elastomeric tube being recoverable to at least a part of its original size and shape after collapse of said support, comprising:

a plurality of substantially longitudinally extending portions being formed of a first material;

a plurality of neighboring substantially longitudinally extending frangible zones, each said longitudinally extending portion being connected to each neighboring longitudinally extending portion by one of said longitudinally extending frangible zones to form a rigid structure; and said longitudinally extending frangible zones being formed from a second material having an elongation at break value substantially lower than first material said longitudinally extending portions.

2. A hollow crushable support for supporting an elastomeric tube, the elastomeric tube being recoverable to at least a part of its original size and shape after collapse of said support, comprising:

a plurality of substantially longitudinally extending portions formed from a first material;

a plurality of neighboring connection portions, each longitudinally extending portion being connected to, and spaced apart from neighboring longitudinally extending portions by at least one of said connection portions to form a rigid structure; and said at least one of said connection portions including at least one frangible zone, wherein said frangible zone is formed a second material having a substantially lower elongation at break than elongation at break than said first material.

3. A hollow crushable support according to claim 1 wherein said first or second material is selected from the group consisting of polymethylmethacrylate, polystyrene and a liquid crystal polymer.

4. A hollow crushable support according to claim 3 wherein said frangible zone is a weld line of said polymer or of said first material and said second material.

5. A hollow crushable support according to claim 2 wherein said first or second material is selected from the group consisting of polymethylmethacrylate, polystyrene and a liquid crystal polymer.

6. A hollow crushable support according to claim 5 wherein said frangible zone is a weld line of said polymer or of said first material and said second material.

7. A cover assembly including a hollow crushable support according to claim 1 and a radially stretched elastomeric tube supported by said support.

8. A cover assembly including a hollow crushable support according to claim 2 and a radially stretched elastomeric tube supported by said support.

9. A cover assembly according to claim 7, wherein said hollow crushable support is a crushable core inside the radially stretched elastomeric tube.

10. A cover assembly according to claim 7 wherein said radially stretched elastomeric tube is longer than said crushable support and at least one end of said radially stretched elastomeric tube is folded back over the remaining part of said elastomeric tube.

11. A cover assembly according to claim 8, wherein said hollow crushable support is a crushable core inside the radially stretched elastomeric tube.

12. A cover assembly according to claim 8 wherein said radially stretched elastomeric tube is longer than said crushable support and at least one end of said radially stretched elastomeric tube is folded back over the remaining part of said elastomeric tube.

13. A cover assembly according to claim 7 further including at least one additional layer within said support of a viscous, sealant material.

14. A cover assembly according to claim 8 further including at least one additional layer within said support of a viscous, sealant material.

* * * * *